United States Patent
Zhao

(10) Patent No.: US 8,788,089 B2
(45) Date of Patent: Jul. 22, 2014

(54) UNLOADING SYSTEM

(71) Applicants: Hong Fu Jin Precision Industry (ShenZhen) Co., Ltd., Shenzhen (CN); Hon Hai Precision Industry Co., Ltd., New Taipei (TW)

(72) Inventor: Guo-Ming Zhao, Shenzhen (CN)

(73) Assignees: Hong Fu Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/959,742

(22) Filed: Aug. 6, 2013

(65) Prior Publication Data
US 2014/0094961 A1 Apr. 3, 2014

(30) Foreign Application Priority Data
Sep. 29, 2012 (CN) .......................... 2012 1 0372665

(51) Int. Cl.
*G06F 7/00* (2006.01)
*G06F 19/00* (2011.01)
(52) U.S. Cl.
USPC ........... 700/218; 700/213; 700/228; 700/245; 700/247; 700/248; 700/253; 700/258; 700/259

(58) Field of Classification Search
None
See application file for complete search history.

(56) References Cited

U.S. PATENT DOCUMENTS

2006/0259195 A1\* 11/2006 Eliuk et al. ..................... 700/245
2012/0209415 A1\* 8/2012 Casanelles et al. ........... 700/109

\* cited by examiner

*Primary Examiner* — Yolanda Cumbess
(74) *Attorney, Agent, or Firm* — Novak Druce Connolly Bove + Quigg LLP

(57) ABSTRACT

A unloading system for unloading a first workpiece and a second workpiece hanged on different sides of a rack from the rack, the unloading system includes a transferring mechanism, a sliding rod, a rotating assembly, at least two robot arms, at least two unloading mechanisms, and a controller. The transferring mechanism includes a worktable, a transferring assembly mounted on the worktable; and a clamping assembly movably mounted on the transferring assembly. The sliding rod is arranged parallel to a transferring direction of the transferring assembly. The rotating assembly is slidably hanged on the sliding rod and connected to the rack. The at least two robot arms are separately arranged adjacent to the worktable and equipped with sensors. The at least two unloading mechanisms are respectively assembled to the at least two robot arms.

20 Claims, 5 Drawing Sheets

UNLOADING SYSTEM

BACKGROUND

1. Technical Field

The present disclosure relates to a unloading system, and more particularly, to a unloading system employed in an automated production line.

2. Description of Related Art

In the field of industrial machining, a number of workpieces are hung on different sides of a number of racks at different positions of the racks. After machining, the racks together with the workpieces are transferred to an unloading area via a transferring mechanism. Operators unload the workpieces from the racks with special tools, and place the workpieces on the transferring mechanism. Then the racks are transferred to a hanging area. As unloading of the workpieces requires human labor to be accomplished, it is thus labor-consuming and inefficient.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
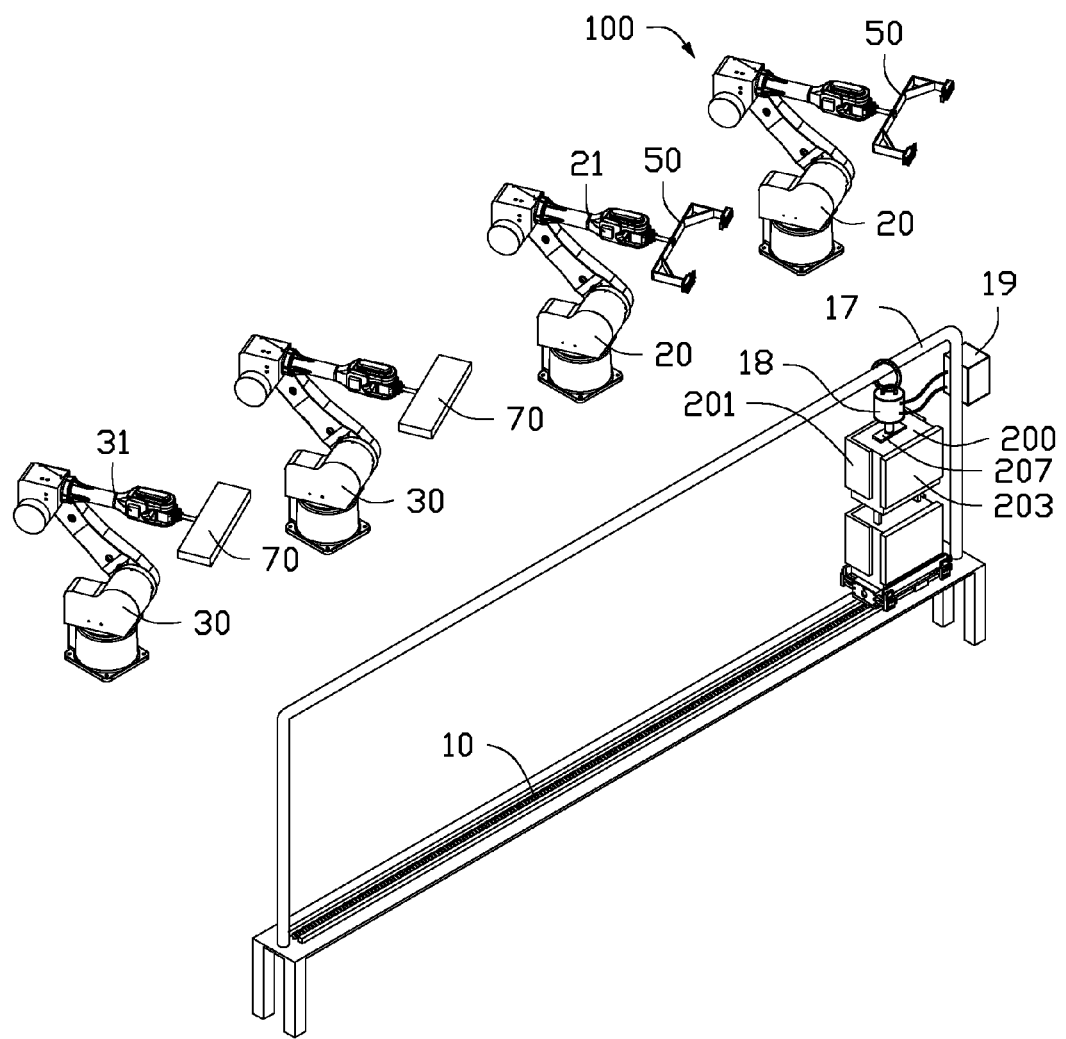
FIG. 1 is an isometric view of an embodiment of an unloading system, the unloading system including a pair of first unloading mechanisms, a pair of second unloading mechanisms, a pair of first robot arms, and a pair of second robot arms.
Figure 2:
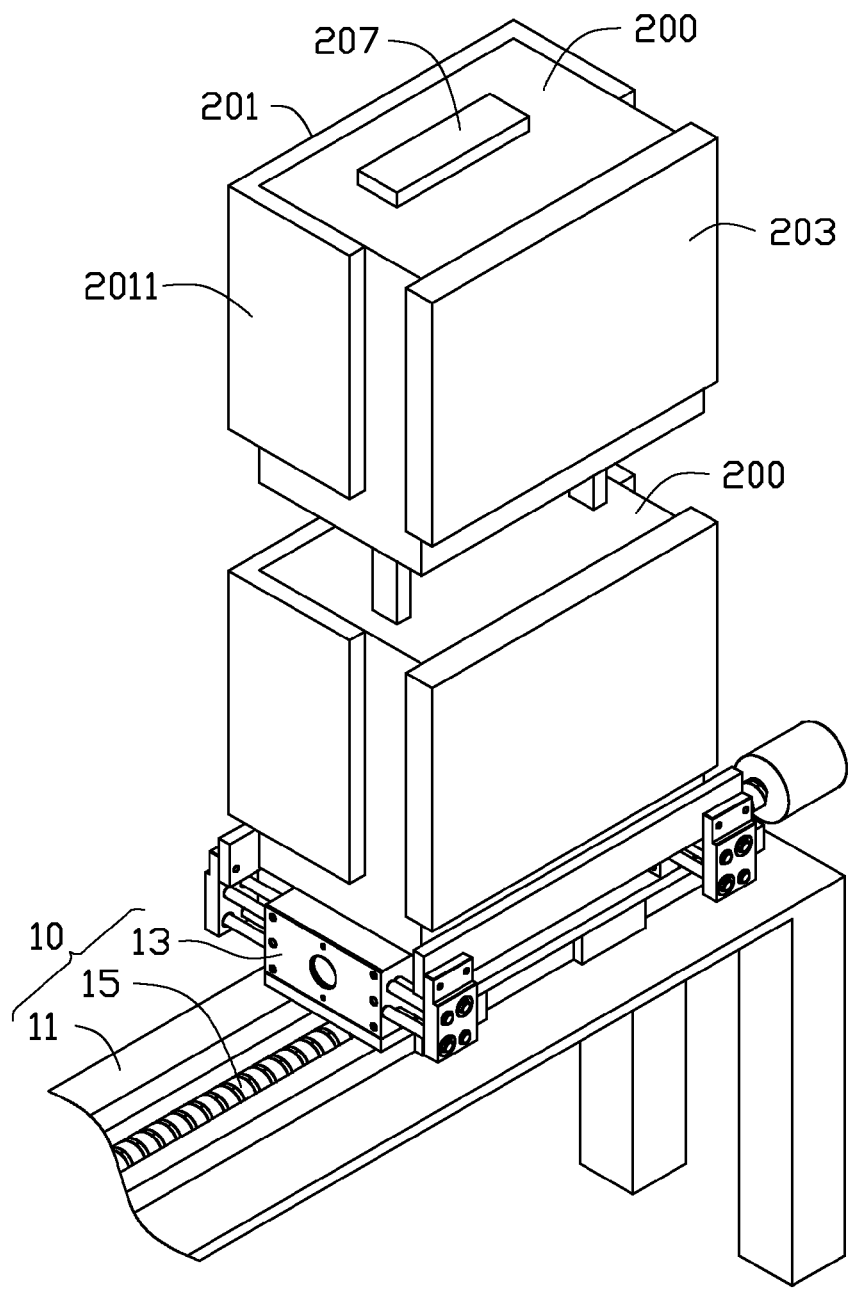
FIG. 2 is a partial, enlarged view of the unloading system of FIG. 1.

FIGS. 1 and 2 show an embodiment of an unloading system 100. The unloading system 100 is employed to unload a first workpiece 201 and a second workpiece 203 from a rack 200. In the illustrated embodiment, the rack 200 is in cubic shape, and includes a hanging portion 207 at a top thereof. The first workpiece 201 is substantially "U" shaped, and includes a pair of holding portions 2011 clamping opposite sidewalls of the rack 200. The second workpiece 203 is located apart from the first workpiece 201, and hung on another sidewall of the rack 200 adjacent to the sidewalls of which the first workpiece 201 is hung.

The unloading system 100 includes a sliding rod 17, a rotating assembly 18, a controller 19, a transferring mechanism 10, a pair of first robot arms 20, a pair of second robot arms 30, a pair of first unloading mechanisms 50, and a pair of second unloading mechanisms 70. The sliding rod 17 is located above the transferring mechanism 10 and arranged parallel to a transferring direction of the transferring mechanism 10. The rotating assembly 18 is slidably mounted on the sliding rod 17 and connected to the hanging portion 207 of the rack 200. The rack 200 is rotatable relative to the sliding rod 17 driven by the rotating assembly 18, thereby by alternating the first workpiece 201 or the second workpiece 203 to face the second robot arm 20. In the illustrated embodiment, the rotating assembly 18 is a rotary cylinder. The rotating assembly 18 may be other rotating units.

The controller 19 is electrically connected to the transferring mechanism 10, the rotating assembly 18, the pair of first robot arms 20, the pair of second robot arms 30, the pair of first unloading mechanisms 50, and the pair of second unloading mechanisms 70. The pair of first robot arms 20 is equipped with a plurality of sensors 21, and the pair of second robot arms 30 is equipped with a plurality of sensors 31. The sensors 21, 31 are connected to the controller 19. When the rack 200 is transferred by the transferring mechanism 10 to arrive near to the first robot arms 20 or the second robot arm 30, the sensor 21 on the first robot arm 20 and the sensor 31 on the second robot arm 30 senses the rack 200, and sends a signal to the controller 19. The controller 19 controls the first robot arm 20 and the second robot arm 30 to move following or trailing the rack 200 and to simultaneously unload the first workpiece 201 or the second workpiece 203. In the embodiment, the first robot arms 20 and the second robot arms 30 are multi-axis robot arms, respectively.

Figure 3:
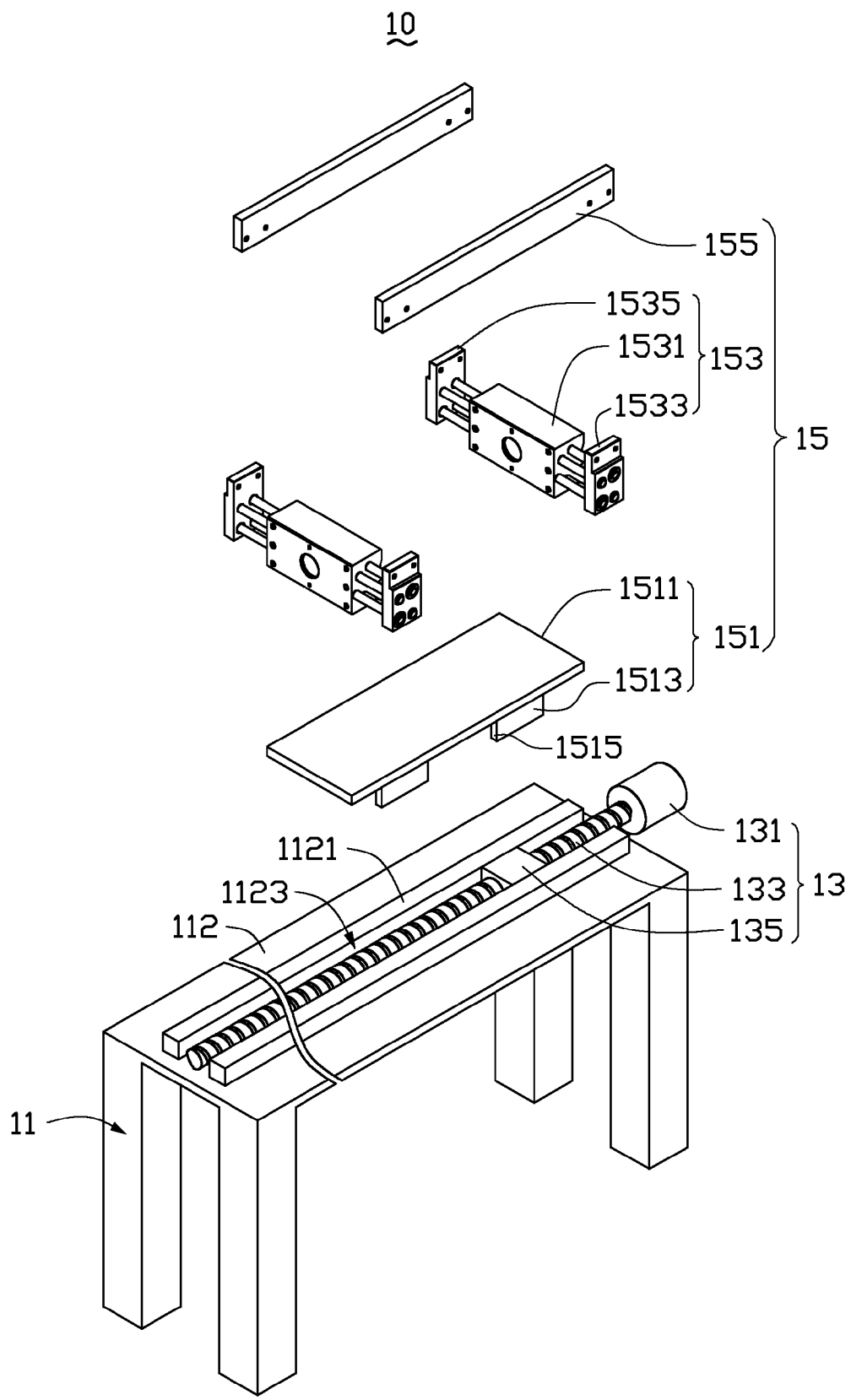
FIG. 3 is an exploded, isometric view of the unloading system of FIG. 1.

FIG. 3 show that the transferring mechanism 10 is parallel to the sliding rod 17 and located below the sliding rod 17. The transferring mechanism 10 includes a worktable 11, a transferring assembly 13 and a clamping assembly 15. The worktable 11 includes a mounting surface 112 on a top thereof, a pair of guiding portions 1121 on the mounting surface 112, and defines a receiving groove 1123 between the pair of guiding portions 1121. The mounting surface 112 is substantially rectangular. The pair of guiding portions 1121 extends along a longitudinal direction of the mounting surface 112. The transferring assembly 13 is mounted on the mounting surface 112, and includes a first driving member 131, a screw leading rod 133, and a nut 135. The first driving member 131 is assembled onto an end of the mounting surface 112 and adjacent to the pair of guiding portions 1121. The first driving member 131 is electrically connected to the controller 19. The screw leading rod 133 is received in the receiving groove 1123 and connected to the first driving member 131. The first driving member 131 is controlled by the controller 19 to rotate the screw leading rod 133 to relative to the worktable 11. The nut 135 is sleeved on the screw leading rod 133 and engages with the screw leading rod 133. When the screw leading rod 133 rotates, the nut 135 moves along an axial direction of the screw leading rod 133.

The clamping assembly 15 is fixed to the nut 135, and includes a sliding seat 151, a pair of second driving members 153, and a pair of clamping members 155. The sliding seat 151 is slidably assembled to the pair of guiding portions 1121 and fixed to the nut 135. The sliding seat 151 includes a main body 1511 and four sliding portions 1513 on the main body 1511. The main body 1511 is substantially in a rectangular shape, and fixed to the nut 135. The four sliding portions 1513 are separately mounted on a first side of the main body 1511 facing the pair of guiding portions 1121. The four sliding portions 1513 are divided into two groups thereof which are slidably engaging with the pair of guiding portions 1121, respectively. The pair of second driving members 153 is mounted on a second side of the main body 1511 opposite to the sliding portions 1513. The pair of second driving members 153 is arranged at opposite ends of the main body 1511.

Each second driving member 153 includes a driving portion 1531, a first output portion 1533, and a second output portion 1535. The driving portion 1531 is assembled to the main body 1511, and electrically connected to the controller 19. The first output portion 1533 and the second output portion 1535 are connected to opposite ends of the driving portion 1531, respectively. The first output portion 1533 and the second output portion 1535 are capable of moving away and toward each other. The moving direction of the first output portion 1533 is parallel to the moving direction of the second output portion 1535. Opposite ends of one clamping member 155 are fixed to the first output portions 1533 of the pair of second driving members 153. Opposite ends of the other one clamping member 155 are fixed to the second output portions 1535 of the pair of second driving members 153. The pair of clamping members 155 is driven by the pair of second driving members 153 to move away from and toward each other along a direction perpendicular to the sliding direction of the clamping assembly 15.

In the embodiment, the pair of first robot arms 20 unload the first workpieces 201 from the rack 200, then the clamping assembly 15 releases the rack 200; the rotating assembly 18 rotates the rack 200 subsequently, relative to the worktable 11 to enable the second workpiece 203 to face the pair of second robot arms 20. Thereafter, the pair of second robot arms 30 unload the second workpieces 203 from the rack 200.

Figure 4:
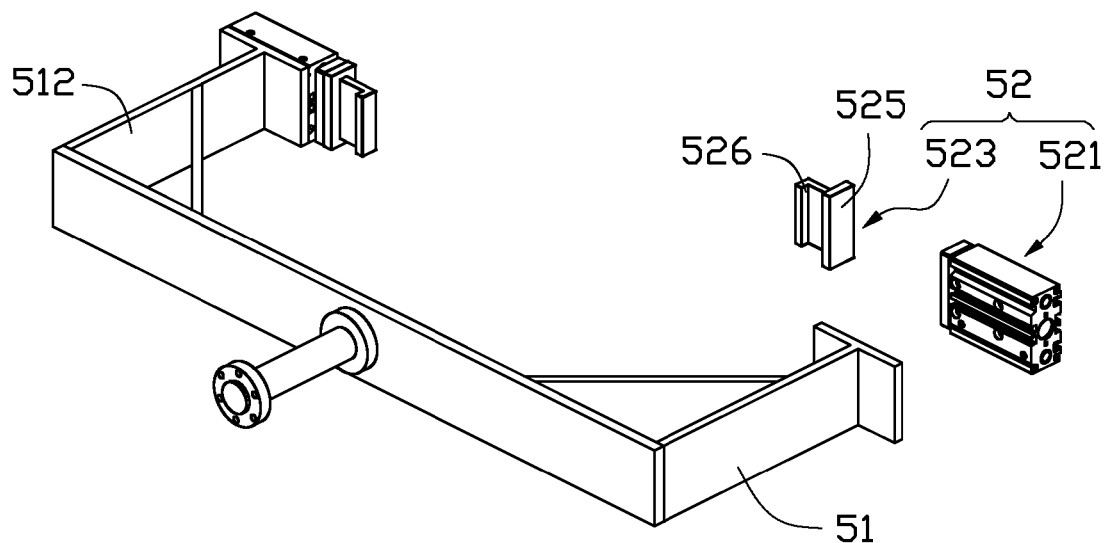
FIG. 4 is an exploded, isometric view of the first unloading mechanism of FIG. 1.

The pair of first unloading mechanisms 50 are mounted on output ends (not labeled) of the pair of first robot arms 20. Also referring to FIG. 4, the first unloading mechanism 50 includes a supporting bracket 51 and a pair of handling assemblies 52 connected to the supporting bracket 51. The supporting bracket 51 is assembled to the output end of the first robot arm 20, and is substantially in a "U" shape. The supporting bracket 51 includes a pair of mounting portions 512 at a distal end thereof away from the first robot arm 20. The pair of mounting portions 512 is separated from each other. The pair of handling assemblies 52 is respectively mounted on the pair of mounting portions 512. The handling assembly 52 includes a third driving member 521 and a latching member 523 connected to the third driving member 521. The third driving member 521 is mounted on the mounting portion 512. The pair of latching members 523 is driven by the pair of third driving members 521 toward each other to clamp the first workpiece 201. In the embodiment, the latching member 523 includes a fixing portion 525, and a latching portion 526 bent from the fixing portion 525 toward an inner side of the supporting bracket 51. The fixing portion 525 is fixed to the third driving member 521, and the latching portion 526 is employed to clamp the first workpiece 201.

The pair of second unloading mechanisms 70 are mounted on output ends (not labeled) of the pair of second robot arms 30. When powering on, the second unloading mechanism 70 generates an electromagnetic force to attract and provide suction to the second workpiece 203, and the second robot arm 30 drives the second workpiece 203 from the rack 200 via the second unloading mechanism 70.

When assembling, the rotating assembly 18 is slidably mounted on the sliding rod 17. The first driving member 131 of the transferring assembly 13 is assembled to the mounting surface 112 of the worktable 11. The screw leading rod 133 is received in the receiving groove 1123 and connected to the first driving member 131. The nut 135 is sleeved on the screw leading rod 133 and engages with the screw leading rod 133. The sliding seat 151 is slidably assembled to the pair of guiding portions 1121 and fixed to the nut 135. The pair of second driving members 153 is mounted on the main body 1511 of the sliding seat 151. The pair of clamping members 155 is mounted on the first output portions 1533 and the second output portions 1535 of the pair of second driving members 153. The pair of first robot arms 20 and the pair of second robot arms 30 are assembled adjacent to a side of the transferring mechanism 10. The pair of first unloading mechanisms 50 is mounted on output ends of the pair of first robot arms 20. The pair of second unloading mechanisms 70 is mounted on output ends of the pair of second robot arms 30.

When in use, the pair of clamping members 155 clamps a bottom of the rack 200, the hanging portion 207 of the rack 200 is connected to the rotating assembly 18. The transferring assembly 13 transfers the rack 200 toward one first robot arm 20. The first robot arm 20 senses the rack 200 and moves along following the rack 200, and simultaneously, the first robot arm 20 drives the first unloading mechanism 50 toward the rack 200. The pair of latching portions 526 of the latching member 523 moves toward each other via the pair of third driving members 521, thereby resisting on distal ends of the pair of holding portions 2011 away from the first robot arms 20. The first robot arm 20 drives the first unloading mechanism 50 away from the rack 200, therefore, the pair of holding portions 2011 of the first workpiece 201 are bent away from each other, and the pair of latching portions 526 are respectively received between the pair of the holding portions 2011 and the rack 200. When the first workpiece 201 is separated from the rack 200, the pair of latching portions 526 is driven by the pair of third driving members 521 to move away from each other, thereby more stably clamping the first workpiece 201. The first robot arm 20 drives the first unloading mechanism 50 away from the rack 200 and unloads the first workpiece 201 from the rack 200.

Similarly, the transferring assembly 13 transfers the rack 200 toward the other one first robot arm 20, the other one first workpiece 201 is disassembled or dismounted from the rack 200 by the other first unloading mechanism 50 in the same procedure. When the transferring assembly 13 transfers the rack 200 toward the second robot arm 20, under the control of the controller 19, the pair of clamping members 155 are driven by the pair of second driving members 153 is to release the rack 200. The rotating assembly 18 rotates the rack 200 subsequently to enable the second workpiece 203 to face the second robot arm 30. The pair of clamping members 155 drives the bottom of the rack 200 to hold the rack 200. The second robot arm 30 senses the rack 200 and moves along following the rack 200. The first robot arm 20 simultaneously drives the second unloading mechanism 70 toward the rack 200 until the second unloading mechanism 70 contacts the second workpiece 203. The second unloading mechanism 70 is powered on and provides suction force for holding the second workpiece 203. The second robot arm 30 drives the second unloading mechanism 70 away from the rack 200, thereby unloading the second workpiece 203 from the rack 200. Similarly, the other one second workpiece 203 is disassembled or dismounted from the rack 200 by the other one second robot arm 30.

Figure 5:
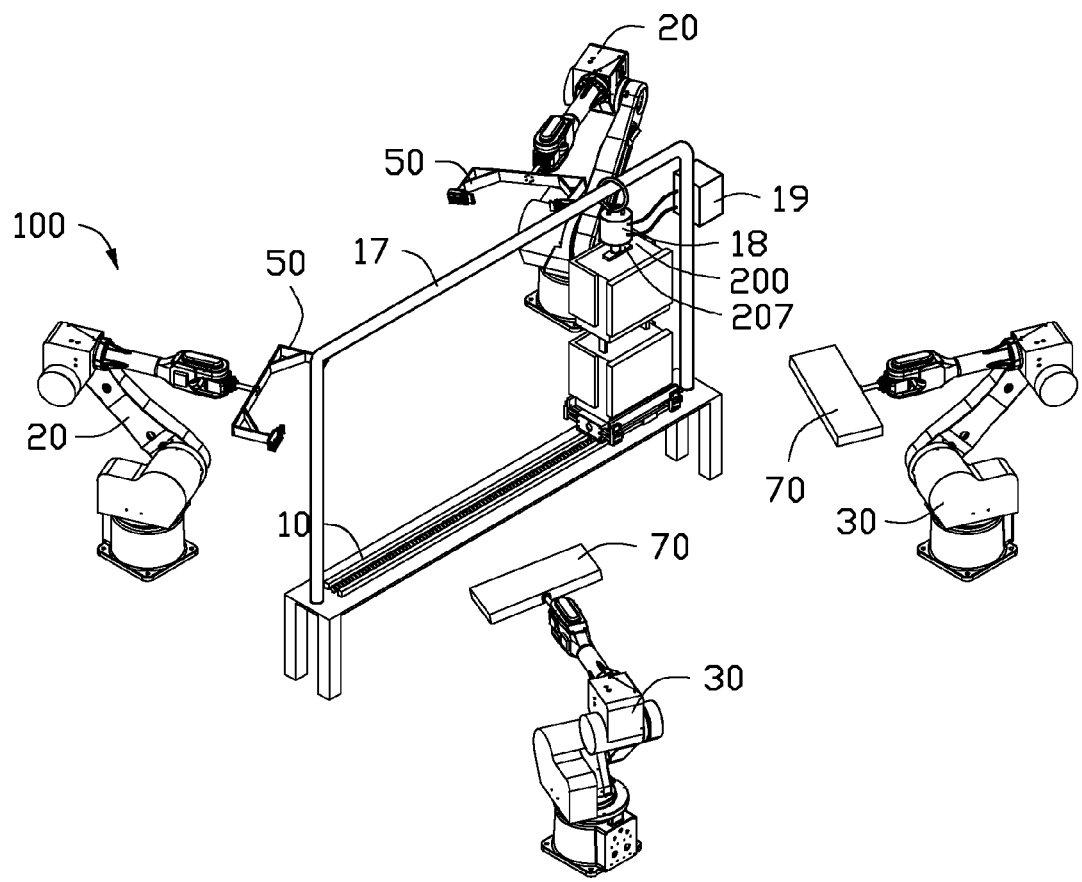
FIG. 5 is an isometric view of the unloading system of FIG. 1 with the first robot arm and the second robot arm symmetrically arranged.

FIG. 5 shows that the pair of first robot arms 20 and the pair of second robot arms 30 may be arranged symmetrically, at opposite sides of the transferring mechanism 10. The first robot arms 20 and the second robot arms 30 unload the first workpiece 201 and the second workpiece 203 simultaneously. The other first workpiece 201 and the other second workpiece 203 are disassembled from the rack 200 via the other first robot arm 20 and the other second robot arm 30. Therefore, a rotation of the rack 200 by the rotating assembly 18 is omitted.

The number of the sliding portions 1513, the guiding portions 1121, the first robot arms 20, the second robot arms 30, the first unloading mechanisms 50, and the second unloading mechanisms 70 is not limited thereto, also may be one or more than two. When the pair of clamping assembly 15 is directly mounted on the second robot arms 30, the supporting bracket 51 may be omitted. The transferring assembly 13 may be substituted by a transmission belt sleeved on a platform. When the second unloading mechanism 70 is mounted on the first robot arm 20, the second robot arms 30 may be omitted. When only the first workpiece 201 needs to be disassembled, the second robot arms 30 may be omitted.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An unloading system for unloading a first workpiece and a second workpiece hung on different sides of a rack from the rack, the unloading system comprising:
    a transferring mechanism comprising:
        a worktable;
        a transferring assembly mounted on the worktable for transferring the rack; and
        a clamping assembly movably mounted on the transferring assembly for clamping or releasing the rack;
    a sliding rod arranged parallel to a transferring direction of the transferring assembly and located above the transferring mechanism;
    a rotating assembly slidably mounted on the sliding rod and connected to the rack;
    at least two robot arms separately arranged adjacent to the worktable and equipped with a plurality of sensors;
    at least two unloading mechanisms respectively assembled to the at least two robot arms; and
    a controller electrically connected to the transferring mechanism, the rotating assembly, the at least two robot arms, the sensors and the at least two unloading mechanisms;
    wherein one of the sensors equipped on one of the at least two robot arms adjacent to the rack senses the rack and sends a signal to the controller, the controller controls the corresponding robot arm to move following the rack, and simultaneously drive the unloading mechanism toward the rack to unload the first workpiece from the rack, the clamping assembly releases the rack, thereafter, the rotating assembly rotates the rack to enable the second workpiece to face an another one of the at least two robot arms, the clamping assembly clamps the rack, the another one robot arm moves to be following the rack and drives the corresponding unloading mechanism to unload the second workpiece from the rack.

2. The unloading system of claim 1, wherein the at least two robot arms comprises a plurality of first robot arms arranged adjacent to a first side of the worktable, the plurality of first robot arms are spaced from each other, the least two unloading mechanisms comprises a plurality of first unloading mechanisms respectively assembled to the plurality of first robot arms, each first unloading mechanism comprises a supporting bracket and a pair of handling assemblies connected to the supporting bracket, the supporting bracket is assembled to the first robot arm, each handling assembly comprises a driving member and a latching member connected to the driving member, the driving member is mounted on the supporting bracket, the pair of driving members drives the pair of latching member toward each other to latch with the first workpiece, and the first robot arm drives the first unloading mechanism away from the rack for unloading the first workpiece.

3. The unloading system of claim 2, the supporting bracket comprises a pair of mounting portions at a distal end thereof away from the first robot arm, the pair of mounting portions is separated from each other, the pair of driving members is mounted on the mounting portion.

4. The unloading system of claim 3, wherein the latching member comprises a fixing portion, and a latching portion bent from the fixing portion toward an inner side of the supporting bracket, the fixing portion is fixed to the driving member.

5. The unloading system of claim 1, wherein the transferring assembly comprises a first driving member, a screw leading rod, and a nut, the first driving member is assembled to the worktable, the screw leading rod is mounted on the worktable and connected to the first driving member, the nut is sleeved on the screw leading rod and engages with the screw leading rod, the clamping assembly is fixed to the nut, when the screw leading rod rotates, the nut drives the clamping assembly to move along an axial direction of the screw leading rod.

6. The unloading system of claim 5, wherein the worktable comprises a mounting surface on a top thereof, a pair of guiding portions on the mounting surface, and defines a receiving groove between the pair of guiding portions, the pair of guiding portions extends along an longitudinal direction of the mounting surface, the first driving member is assembled onto an end of the mounting surface and adjacent to the pair of guiding portions, the first driving member is electrically connected to the controller, the screw leading rod is received in the receiving groove and connected to the first driving member.

7. The unloading system of claim 5, wherein the clamping assembly comprises a sliding seat, a pair of second driving members, and a pair of clamping members, the sliding seat is slidably assembled to the pair of guiding portions and fixed to the nut, the pair of second driving members is mounted on opposite ends of the sliding seat, the pair of clamping members are mounted to opposite ends of the pair of second driving members, and driven by the pair of second driving members to move away from and toward each other along a direction perpendicular to a sliding direction of the clamping assembly relative to the worktable.

8. The unloading system of claim 7, wherein each second driving member comprises a driving portion, a first output portion, and a second output portion, the driving portion is assembled to the sliding seat, and electrically connected to the controller, the first output portion and the second output portion are respectively connected to opposite ends of the driving portion, opposite ends of one clamping member are fixed to two first output portions of the pair of second driving members, and opposite ends of the other clamping member are fixed to two second output portions of the pair of second driving members.

9. The unloading system of claim 7, wherein the sliding seat comprises a main body and a pair of sliding portions on the main body, the main body is fixed to the nut, the pair of sliding portions are separately mounted on a first side of the main body facing the pair of guiding portions, the pair of sliding portions slidably engages with the pair of guiding portions, the pair of second driving members is mounted on a second side of the main body opposite to the sliding portions, the pair of second driving members is arranged at opposite ends of the main body.

10. The unloading system of claim 2, wherein the at least two robot arm further comprises a plurality of second robot arms arranged a second side of the worktable opposite to the first side, the plurality of second robot arms are arranged symmetrically to the plurality of first robot arms, the least two unloading mechanisms comprises a plurality of second unloading mechanisms respectively assembled to the plurality of second robot arms, each second robot arm is configured for driving the second unloading mechanism to unload the second workpiece.

11. An unloading system for unloading a first workpiece and a second workpiece hung on different sides of a rack from the rack, the unloading system comprising:
a transferring mechanism comprising:
a transferring assembly for transferring the rack; and
a clamping assembly movably mounted on the transferring assembly for clamping or releasing the rack;
a sliding rod arranged parallel to a transferring direction of the transferring assembly;
a rotating assembly slidably mounted on the sliding rod and connected to the rack;
at least one first robot arm arranged adjacent to the transferring assembly and equipped with a first sensor;
at least one second robot arm arranged adjacent to the transferring assembly and equipped with a second sensor;
at least one first unloading mechanism assembled to the at least one first robot arms;
at least one second unloading mechanism assembled to the at least one second robot arm;
a controller electrically connected to the transferring mechanism, the rotating assembly, the at least two robot arms, the first sensor, the second sensor, and the at least one first and second unloading mechanisms;
wherein the first sensor of one first robot arm adjacent to the rack senses the rack and sends signal to the controller, the controller controls the one corresponding first robot arm to move following the rack, and simultaneously drive corresponding first unloading mechanism toward the rack to unload the first workpiece from the rack, the clamping assembly releases the rack, thereafter, the rotating assembly rotates the rack to enable the second workpiece to face one second robot arm, the clamping assembly clamps the rack, the one second robot arm moves following the rack and drives the corresponding second unloading mechanism to unload the second workpiece from the rack.

12. The unloading system of claim 11, wherein the at least one first robot arm is arranged adjacent to a first side of the transferring assembly, the at least one first unloading mechanism comprises a supporting bracket and a pair of handling assemblies connected to the supporting bracket, the supporting bracket is assembled to the first robot arm, each handling assembly comprises a driving member and a latching member connected to the driving member, the driving member is mounted on the supporting bracket, the pair of driving members drives the pair of latching member toward each other to latch with the first workpiece, and the first robot arm drives the first unloading mechanism away from the rack for unloading the first workpiece.

13. The unloading system of claim 12, the supporting bracket comprises a pair of mounting portions at a distal end thereof away from the at least one first robot arm, the pair of mounting portions is separated from each other, the pair of driving members is mounted on the mounting portion.

14. The unloading system of claim 13, wherein the latching member comprises a fixing portion, and a latching portion bent from the fixing portion toward an inner side of the supporting bracket, the fixing portion is fixed to the driving member.

15. The unloading system of claim 11, wherein the transferring mechanism further comprises a worktable, the transferring assembly comprises a first driving member, a screw leading rod, and a nut, the first driving member is assembled to the worktable, the screw leading rod is mounted on the worktable and connected to the first driving member, the nut is sleeved on the screw leading rod and engages with the screw leading rod, the clamping assembly is fixed to the nut, when the screw leading rod rotates, the nut drives the clamping assembly to move along an axial direction of the screw leading rod.

16. The unloading system of claim 15, wherein the worktable comprises a mounting surface on a top thereof, a pair of guiding portions on the mounting surface, and defines a receiving groove between the pair of guiding portions, the pair of guiding portions extends along an longitudinal direction of the mounting surface, the first driving member is assembled onto an end of the mounting surface and adjacent to the pair of guiding portions, the first driving member is electrically connected to the controller, the screw leading rod is received in the receiving groove and connected to the first driving member.

17. The unloading system of claim 15, wherein the clamping assembly comprises a sliding seat, a pair of second driving members, and a pair of clamping members, the sliding seat is slidably assembled to the pair of guiding portions and fixed to the nut, the pair of second driving members is mounted on opposite ends of the sliding seat, the pair of clamping members are mounted to opposite ends of the pair of second driving members, and driven by the pair of second driving members to move away from and toward each other along a direction perpendicular to a sliding direction of the clamping assembly relative to the worktable.

18. The unloading system of claim 17, wherein each second driving member comprises a driving portion, a first output portion, and a second output portion, the driving portion is assembled to the sliding seat, and electrically connected to the controller, the first output portion and the second output portion are respectively connected to opposite ends of the driving portion, opposite ends of one clamping member are fixed to two first output portions of the pair of second driving members, and opposite ends of the other clamping member are fixed to two second output portions of the pair of second driving members.

19. The unloading system of claim 17, wherein the sliding seat comprises a main body and a pair of sliding portions on the main body, the main body is fixed to the nut, the pair of sliding portions are separately mounted on a first side of the main body facing the pair of guiding portions, the pair of sliding portions slidably engages with the pair of guiding portions, the pair of second driving members is mounted on a second side of the main body opposite to the sliding portions, the pair of second driving members is arranged at opposite ends of the main body.

20. The unloading system of claim 12, wherein the at least one second robot arm is arranged a second side of the transferring assembly opposite to the first side, the at least one second robot arm is arranged symmetrically to the at least one first robot arm.

* * * * *